United States Patent
Sohi et al.

(10) Patent No.: US 9,407,433 B1
(45) Date of Patent: Aug. 2, 2016

(54) MECHANISM FOR IMPLEMENTING KEY-BASED SECURITY FOR NODES WITHIN A NETWORKED VIRTUALIZATION ENVIRONMENT FOR STORAGE MANAGEMENT

(71) Applicant: Nutanix, Inc., San Jose, CA (US)

(72) Inventors: Aroosh Sohi, Santa Clara, CA (US); Miao Cui, Mountain View, CA (US); Akshay Anand Khole, Sunnyvale, CA (US)

(73) Assignee: Nutanix, Inc., San Jose, CA (US)

( * ) Notice: Subject to any disclaimer, the term of this patent is extended or adjusted under 35 U.S.C. 154(b) by 27 days.

(21) Appl. No.: 14/014,890

(22) Filed: Aug. 30, 2013

(51) Int. Cl.
*H04L 9/08* (2006.01)
(52) U.S. Cl.
CPC .................... *H04L 9/0861* (2013.01)
(58) Field of Classification Search
CPC ................. H04L 9/0861; H04L 9/08
See application file for complete search history.

(56) References Cited

U.S. PATENT DOCUMENTS

| | | | | |
|---|---|---|---|---|
| 5,706,348 A * | 1/1998 | Gray | ..................... | H04L 9/0891 380/260 |
| 6,356,977 B2 * | 3/2002 | Ofek et al. | ..................... | 711/112 |
| 7,660,983 B1 * | 2/2010 | Srivastava | ............. | H04L 9/0822 713/163 |
| 2005/0246771 A1 * | 11/2005 | Hunt et al. | ....................... | 726/18 |
| 2006/0080417 A1 * | 4/2006 | Boutboul et al. | ............. | 709/220 |
| 2007/0299624 A1 * | 12/2007 | Motobayashi et al. | ........ | 702/117 |
| 2008/0298587 A1 * | 12/2008 | Luk | .......................... | H04L 9/083 380/255 |
| 2011/0161659 A1 * | 6/2011 | Himawan et al. | ............. | 713/156 |
| 2012/0030318 A1 * | 2/2012 | Ryder | ........................... | 709/220 |
| 2012/0030343 A1 * | 2/2012 | Ryder | ........................... | 709/224 |
| 2012/0079474 A1 * | 3/2012 | Gold et al. | .................... | 717/173 |
| 2013/0155902 A1 * | 6/2013 | Feng | ................... | H04L 67/1031 370/255 |
| 2013/0318343 A1 * | 11/2013 | Bjarnason et al. | ............. | 713/157 |
| 2014/0095878 A1 * | 4/2014 | Shimano et al. | .............. | 713/171 |
| 2014/0215221 A1 * | 7/2014 | Gauvreau | ............. | H04L 9/0891 713/176 |

* cited by examiner

*Primary Examiner* — Joseph P Hirl
*Assistant Examiner* — J. Brant Murphy
(74) *Attorney, Agent, or Firm* — Vista IP Law Group, LLP; Peter Mei

(57) ABSTRACT

A method for providing key-based security for adding a new node to an existing networked virtualization environment for storage management includes discovering the new node, establishing communication with the new node using a factory public key, requesting the new node to generate a new private key and new public key pair, receiving the new public key by the existing virtualization environment, wherein subsequent communication with the new node by the existing virtualization environment is performed using the new public key, and configuring the new node to become part of the existing virtualization environment using the new public key.

44 Claims, 15 Drawing Sheets

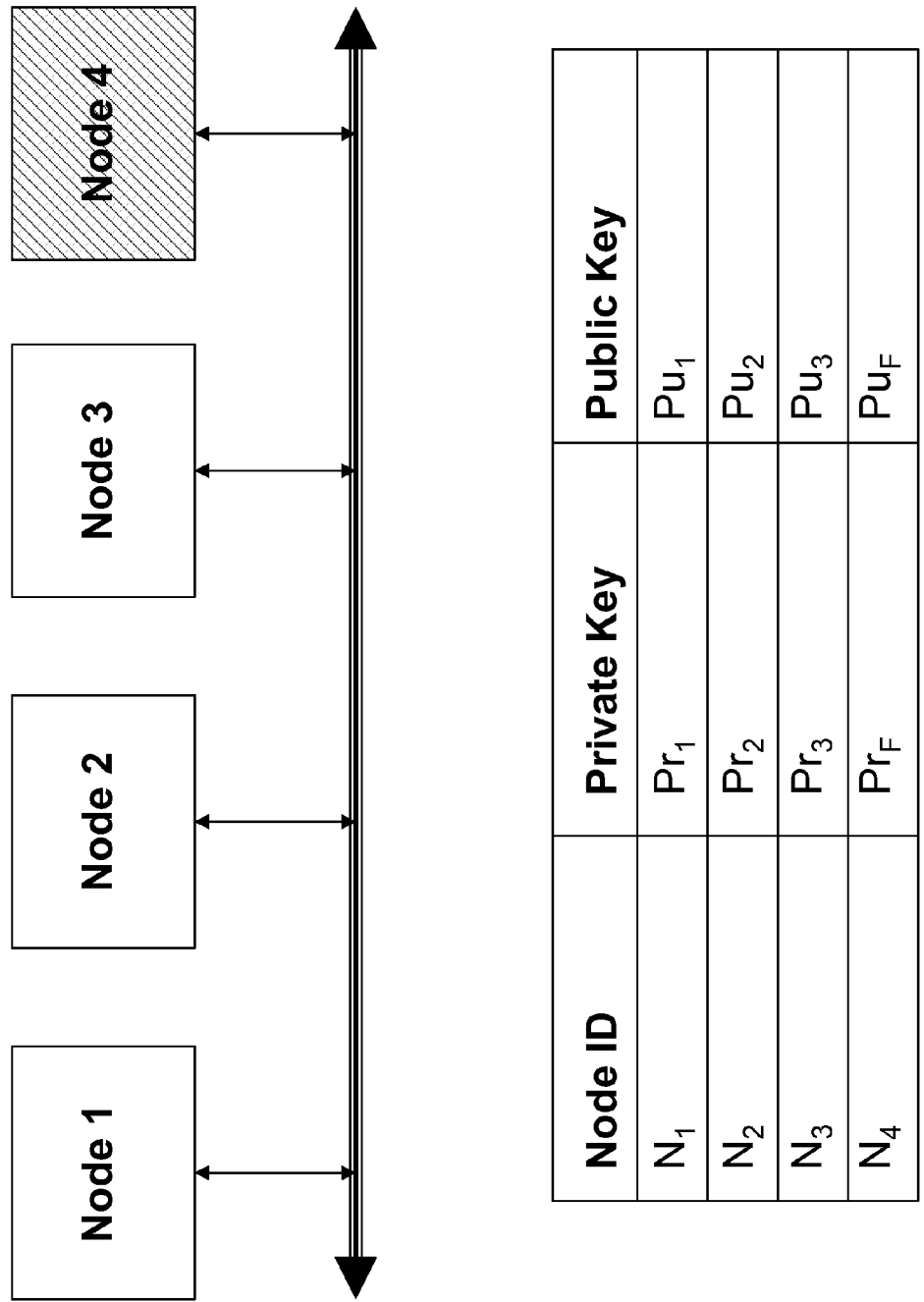

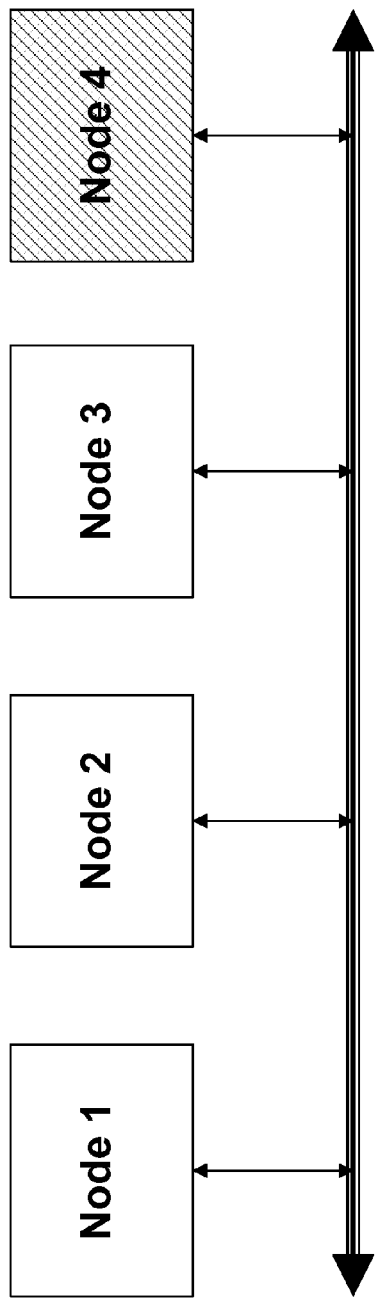

MECHANISM FOR IMPLEMENTING KEY-BASED SECURITY FOR NODES WITHIN A NETWORKED VIRTUALIZATION ENVIRONMENT FOR STORAGE MANAGEMENT

CROSS REFERENCE TO RELATED APPLICATIONS

The present application is related to application Ser. No. 13/207,345, filed on Aug. 10, 2011, entitled "ARCHITECTURE FOR MANAGING I/O AND STORAGE FOR A VIRTUALIZATION ENVIRONMENT", application Ser. No. 13/207,357, filed on Aug. 10, 2011, entitled "METADATA FOR MANAGING I/O AND STORAGE FOR A VIRTUALIZATION ENVIRONMENT", application Ser. No. 13/207,365, filed on Aug. 10, 2011, entitled "METHOD AND SYSTEM FOR IMPLEMENTING A MAINTENANCE SERVICE FOR MANAGING I/O AND STORAGE FOR A VIRTUALIZATION ENVIRONMENT", which are all hereby incorporated by reference in their entirety.

FIELD

This disclosure concerns a networked virtualization environment for storage management, and in particular to a mechanism for implementing key-based security for nodes within the networked virtualization environment for storage management.

BACKGROUND

Key-based security is a mechanism used to provide security between communicating entities (e.g., servers). Keys are pieces of information (e.g., parameters) that determine the functional output of a cryptographic algorithm. During encryption, a key specifies the particular transformation used to encrypt a piece of data. Likewise, during decryption, a key specifies the particular transformation used to decrypt a piece of data. This is in contrast to password-based security in which data is transmitted between entities so long as an entity can be properly authenticated using a password. Generally, keys are preferred over passwords because of their enhanced security and decreased susceptibility to being stolen.

Conventionally, an entity that utilizes key-based security generates a public key/private key pair. The public key is released by the key-generating entity to the public to allow external entities to communicate with the key-generating entity. External entities then utilize the public key to encrypt data that they wish to communicate with the key-generating entity. The key-generating entity then utilizes the private key to decrypt data received from the external entities. In this way, communication with a key-generating entity can be controlled by controlling access to the public key by external entities. In the situation where a public key becomes lost or stolen, the key generating entity may simply generate a new public key/private key pair for subsequent communication.

A networked virtualization environment for storage management includes a number of nodes (e.g., servers, data centers, etc.) operating in a closed networked environment. Each node services the storage needs for a number of virtual machines running within a virtualization environment of the node using local storage as well as cloud storage or networked storage. The addition of nodes to an existing networked virtualization environment requires added security measures to ensure that unauthorized/accidental entry into the added node is prevented. Likewise, any security mechanism used within the networked virtualization environment for storage management must be able to overcome the limitations of password-based security.

SUMMARY

Embodiments of the present invention provide a mechanism for implementing key-based security for nodes within a networked virtualization environment for storage management.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 5A-5D illustrate a method for providing key-based security for adding nodes within a networked virtualization environment for storage management according to some embodiments of the invention.

FIGS. 8A-8D illustrate a method for providing key-based security for removing nodes from a networked virtualization environment for storage management according to some embodiments of the invention.

DETAILED DESCRIPTION OF THE EMBODIMENTS OF THE INVENTION

Figure 1:
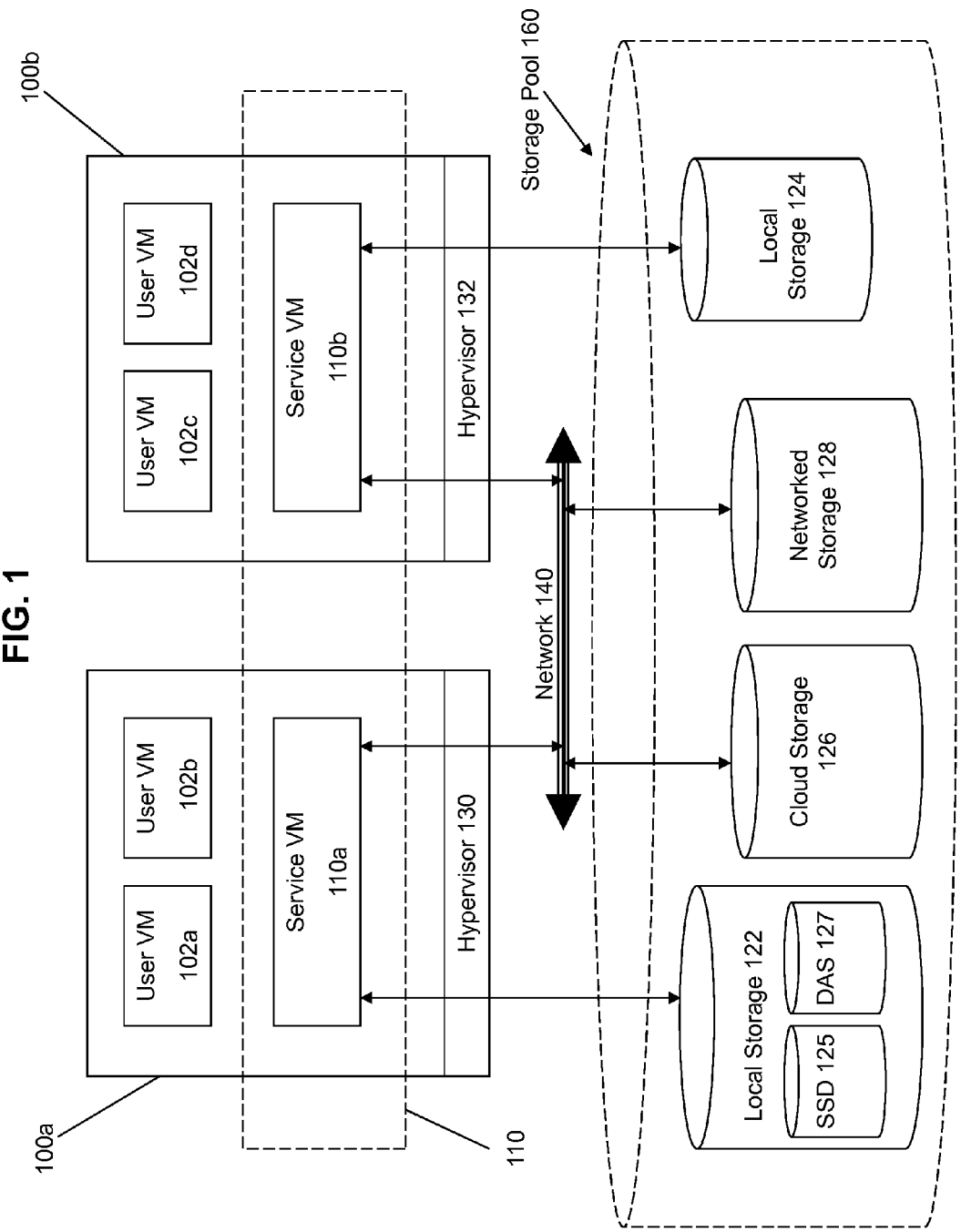
FIG. 1 illustrates an example networked virtualization environment for storage management according to some embodiments of the invention.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments", in various places throughout this specification are not necessarily referring to the same embodiment or embodiments.

Key-based security is a mechanism used to provide security between communicating entities (e.g., servers). Keys are pieces of information (e.g., parameters) that determine the functional output of a cryptographic algorithm. During encryption, a key specifies the particular transformation used to encrypt a piece of data. Likewise, during decryption, a key specifies the particular transformation used to decrypt a piece of data. This is in contrast to password-based security in which data is transmitted between entities so long as an entity can be properly authenticated using a password. Generally, keys are preferred over passwords because of their enhanced security and decreased susceptibility to being stolen.

Conventionally, an entity that utilizes key-based security generates a public key/private key pair. The public key is released by the key-generating entity to the public to allow external entities to communicate with the key-generating entity. External entities then utilize the public key to encrypt data that they wish to communicate with the key-generating entity. The key-generating entity then utilizes the private key to decrypt data received from the external entities. In this way, communication with a key-generating entity can be controlled by controlling access to the public key by external entities. In the situation where a public key becomes lost or stolen, the key generating entity may simply generate a new public key/private key pair for subsequent communication.

A networked virtualization environment for storage management includes a number of nodes (e.g., servers, data centers, etc.) operating in a closed networked environment. Each node services the storage needs for a number of virtual machines running within a virtualization environment of the node using local storage as well as cloud storage or networked storage. The addition of nodes to an existing networked virtualization environment requires added security measures to ensure that unauthorized/accidental entry into the added node is prevented. Likewise, any security mechanism used within the networked virtualization environment for storage management must be able to overcome the limitations of password-based security.

FIG. 1 illustrates an example networked virtualization environment for storage management according to some embodiments of the invention. The networked virtualization environment of FIG. 1 can be implemented for a distributed platform that contains multiple nodes (e.g., servers) 100a and 100b that manages multiple-tiers of storage. The multiple tiers of storage include storage that is accessible through a network 140, such as cloud storage 126 or networked storage 128 (e.g., a SAN or "storage area network"). Unlike the prior art, the present embodiment also permits local storage 122/124 that is within or directly attached to the node and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structured from the storage devices in the storage pool 160. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each node 100a or 100b runs virtualization software, such as VMWare ESX(i), Microsoft Hyper-V, or RedHat KVM. The virtualization software includes a hypervisor 130/132 to manage the interactions between the underlying hardware and the one or more user VMs 102a, 102b, 102c and 102d that run client software.

A special VM 110a/110b is used to manage storage and I/O activities according to some embodiments of the invention, which is referred to herein as a "Service VM". This is the "Storage Controller" in the currently described networked virtualization environment for storage management. Multiple such storage controllers coordinate within a cluster to form a single-system. The Service VMs 110a/110b are not formed as part of specific implementations of hypervisors 130/132. Instead, the Service VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Service VMs run above the hypervisors 130/132, this means that the current approach can be used and implemented within any virtual machine architecture, since the Service VMs of embodiments of the invention can be used in conjunction with any hypervisor from any virtualization vendor.

Each Service VM 110a-b exports one or more block devices or NFS server targets that appear as disks to the client VMs 102a-d. These disks are virtual, since they are implemented by the software running inside the Service VMs 110a-b. Thus, to the user VMs 102a-d, the Service VMs 110a-b appear to be exporting a clustered storage appliance that contains some disks. All user data (including the operating system) in the client VMs 102a-d resides on these virtual disks.

Significant performance advantages can be gained by allowing the virtualization environment to access and utilize local (e.g., server-internal) storage 122. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization environment is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Service VM 110a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Service VMs include quality of service (QOS) functions, encryption and compression. The networked virtualization environment massively parallelizes storage, by placing a storage controller—in the form of a Service VM—at each hypervisor, and thus makes it possible to render enough CPU and memory resources to achieve the aforementioned optimizations.

Additional details regarding networked virtualization environments for storage management are described in co-pending application Ser. No. 13/207,345, entitled "Architecture for Managing I/O and Storage for a Virtualization Environment", which is hereby incorporated by reference in its entirety.

The Service VM is the primary software component within a node that virtualizes I/O access to hardware resources within a storage pool according to some embodiments of the invention. This approach essentially provides for a separate and dedicated controller for each and every node within a virtualized data center (a cluster of nodes that run some flavor of hypervisor virtualization software), since each node will include its own Service VM. This is in contrast to conventional storage architectures that provide for a limited number of storage controllers (e.g., four controllers) to handle the storage workload for the entire system, and hence results in significant performance bottlenecks due to the limited number of controllers. Unlike the conventional approaches, each new node will include a Service VM to share in the overall workload of the system to handle storage tasks. Therefore, the current approach is infinitely scalable, and provides a significant advantage over the conventional approaches that have a limited storage processing power. Consequently, the currently describe approach creates a massively-parallel storage architecture that scales as and when hypervisor hosts are added to a node.

Figure 2:
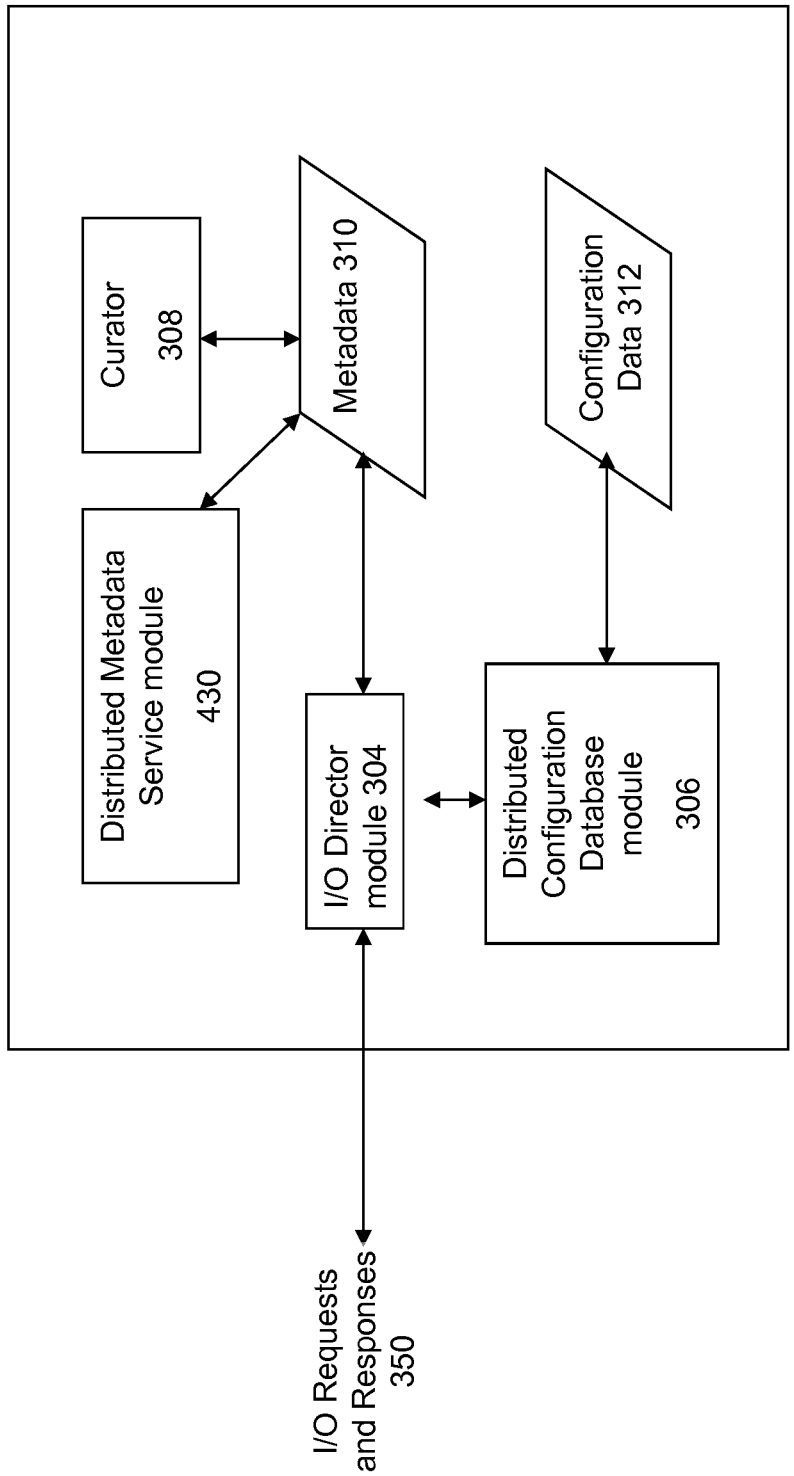
FIG. 2 illustrates the components of a Service VM according to some embodiments of the invention.

FIG. 2 illustrates the internal structures of a Service VM according to some embodiments of the invention. As previously noted, the Service VMs are not formed as part of specific implementations of hypervisors. Instead, the Service VMs run as virtual machines above hypervisors on various nodes. Since the Service VMs run above the hypervisors, this means that the current approach can be used and implemented within any virtual machine architecture, since the Service VMs of embodiments of the invention can be used in conjunction with any hypervisor from any virtualization vendor. Therefore, the Service VM can be configured to operate ubiquitously anywhere within the computing environment, and will not need to be custom-configured for each different type of operating environment. This is particularly useful because the industry-standard iSCSI or NFS protocols allow the Service VM to be hypervisor-agnostic.

The main entry point into the Service VM is the central controller module 304 (which is referred to herein as the "I/O Director module 304"). The term I/O Director module is used to connote the fact that this component directs the I/O from the world of virtual disks to the pool of physical storage resources. In some embodiments, the I/O Director module implements the iSCSI or NFS protocol server.

A write request originating at a user VM would be sent to the iSCSI or NFS target inside the service VM's kernel. This write would be intercepted by the I/O Director module 304 running in user space. I/O Director module 304 interprets the iSCSI LUN or the NFS file destination and converts the request into an internal "vDisk" request (e.g., as described in more detail below). Ultimately, the I/O Director module 304 would write the data to the physical storage.

Each vDisk managed by a Service VM corresponds to a virtual address space forming the individual bytes exposed as a disk to user VMs. Thus, if the vDisk is of size 1 TB, the corresponding address space maintained by the invention is 1 TB. This address space is broken up into equal sized units called vDisk blocks. Metadata 310 is maintained by the Service VM to track and handle the vDisks and the data and storage objects in the system that pertain to the vDisks. The Metadata 310 is used to track and maintain the contents of the vDisks and vDisk blocks.

In order to determine where to write and read data from the storage pool, the I/O Director module 304 communicates with a Distributed Metadata Service module 430 that maintains all the metadata 310. In some embodiments, the Distributed Metadata Service module 430 is a highly available, fault-tolerant distributed service that runs on all the Service VMs in the appliance. The metadata managed by Distributed Metadata Service module 430 is itself kept on the persistent storage attached to the appliance. According to some embodiments of the invention, the Distributed Metadata Service module 430 may be implemented on SSD storage.

Since requests to the Distributed Metadata Service module 430 may be random in nature, SSDs can be used on each server node to maintain the metadata for the Distributed Metadata Service module 430. The Distributed Metadata Service module 430 stores the metadata that helps locate the actual content of each vDisk block. If no information is found in Distributed Metadata Service module 430 corresponding to a vDisk block, then that vDisk block is assumed to be filled with zeros. The data in each vDisk block is physically stored on disk in contiguous units called extents. Extents may vary in size when de-duplication is being used. Otherwise, an extent size coincides with a vDisk block. Several extents are grouped together into a unit called an extent group. An extent group is then stored as a file on disk. The size of each extent group is anywhere from 16 MB to 64 MB. In some embodiments, an extent group is the unit of recovery, replication, and many other storage functions within the system.

Further details regarding methods and mechanisms for implementing Metadata 310 are described below and in co-pending application Ser. No. 13/207,357, which is hereby incorporated by reference in its entirety.

A health management module 308 (which may hereinafter be referred to as a "Curator") is employed to address and cure any inconsistencies that may occur with the Metadata 310. The Curator 308 oversees the overall state of the virtual storage system, and takes actions as necessary to manage the health and efficient performance of that system. According to some embodiments of the invention, the curator 308 operates on a distributed basis to manage and perform these functions, where a master curator on a first server node manages the workload that is performed by multiple slave curators on other server nodes. MapReduce operations are performed to implement the curator workload, where the master curator may periodically coordinate scans of the metadata in the system to manage the health of the distributed storage system. Further details regarding methods and mechanisms for implementing Curator 308 are disclosed in co-pending application Ser. No. 13/207,365, which is hereby incorporated by reference in its entirety.

Service VMs also include a Distributed Configuration Database module 306 to handle certain administrative tasks. The primary tasks performed by the Distributed Configuration Database module 306 are to maintain configuration data 312 for the Service VM and act as a notification service for all events in the distributed system. Examples of configuration data 312 include, for example, (1) the identity and existence of vDisks; (2) the identity of Service VMs in the system; (3) the physical nodes in the system; and (4) the physical storage devices in the system. For example, assume that there is a desire to add a new physical disk to the storage pool. The Distributed Configuration Database module 306 would be informed of the new physical disk, after which the configuration data 312 is updated to reflect this information so that all other entities in the system can then be made aware for the new physical disk. In a similar way, the addition/deletion of vDisks, VMs and nodes would handled by the Distributed Configuration Database module 306 to update the configuration data 312 so that other entities in the system can be made aware of these configuration changes.

Another task that is handled by the Distributed Configuration Database module 306 is to maintain health information for entities in the system, such as the Service VMs. If a Service VM fails or otherwise becomes unavailable, then this module tracks this health information so that any management tasks required of that failed Service VM can be migrated to another Service VM.

The Distributed Configuration Database module 306 also handles elections and consensus management within the system. Another task handled by the Distributed Configuration Database module is to implement ID creation. Unique IDs are generated by the Distributed Configuration Database module as needed for any required objects in the system, e.g., for vDisks, Service VMs, extent groups, etc. In some embodiments, the IDs generated are 64-bit IDs, although any suitable type of IDs can be generated as appropriate for embodiment so the invention. According to some embodiments of the invention, the Distributed Configuration Database module 306 may be implemented on an SSD storage because of the real-time guarantees required to monitor health events.

As mentioned above, the addition of nodes to an existing networked virtualization environment requires added security measures to ensure that unauthorized/accidental entry into the added node is prevented.

Figure 3:
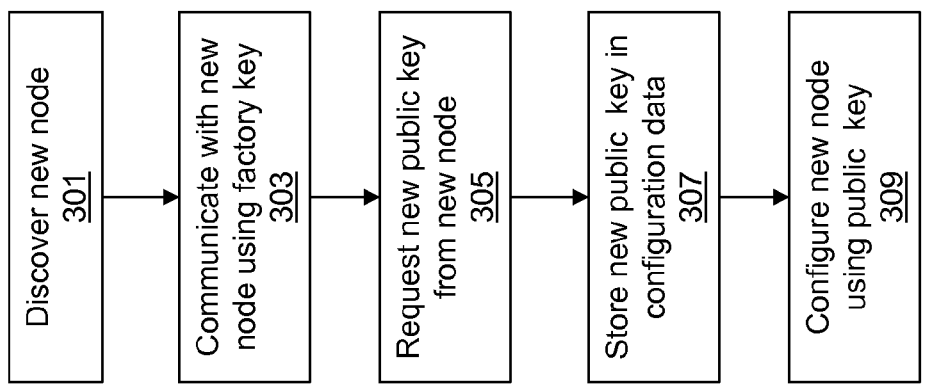
FIG. 3 illustrates a method for providing key-based security for adding nodes within a networked virtualization environment for storage management from the perspective of the existing networked virtualization environment according to some embodiments of the invention.

FIG. 3 illustrates a method for providing key-based security for adding nodes within a networked virtualization environment for storage management according to some embodiments of the invention. FIG. 3 depicts the method for providing key-based security for adding nodes within the networked virtualization environment from the perspective of the existing networked virtualization environment (e.g., cluster of existing nodes).

Initially, when a new node is introduced into a networked virtualization environment for storage management, it is discovered by the existing networked virtualization environment as shown at 301. For example, the Distributed Configuration Database module of a node(s) in the existing networked virtualization environment may identify that a new node is available. In some embodiments, the Distributed Configuration Database module may generate configuration data that indicates the identity of the new node. The Distributed Configuration Database module may then notify an administrator of the networked virtualization environment of the existence of a new node.

When a new node is introduced into a networked virtualization environment for storage management, it is equipped with a default factory key. The default factory key is a key pair that includes a factory public key and a factory private key. The factory public key is provided to entities external to the new node (e.g., existing networked virtualization environment) to allow for those external entities to initialize communication with the new node. The factory public key is generally unsecure, and is only intended for use in initializing communication with the new node.

The factory public key is then utilized by the existing networked virtualization environment to communicate with the new node as shown at 303. The factory public key may be used by the Distributed Configuration Database module of a node(s) in the existing networked virtualization environment to initially communicate with the new node. For example, an administrator may communicate with the new node using the factory public key via a graphical user interface (GUI) of an existing node. Because the factory public key of the new node is known to the existing networked virtualization environment, the new node allows access to the existing networked virtualization environment upon verification of the factory public key.

The existing networked virtualization environment then requests that the new node generate a new key pair as shown at 305. The existing networked virtualization environment may request that the new node generate a new key pair using the existing factory public key. In some embodiments, an administrator may request that the new node generate a new key pair via the GUI of an existing node.

Once the new node generates the new key pair, it retains the new private key and provides the new public key to the existing networked virtualization environment, which will be described in greater detail below. At the same time, the new node deactivates the factory key (e.g., factory public key and factory private key), such that the new node may no longer be accessed via the original factory key. In this way, the new node is shielded from access external to the networked virtualization environment, because only the new node and the existing networked virtualization environment have access to the new public key. Additionally, because the new private key is known only to the new node, unwanted/accidental access to the new node may be prevented.

The existing networked virtualization environment then stores the new public key for the new node in its configuration data as shown at 307. The Distributed Configuration Database module of a node(s) in the existing networked virtualization environment may update its configuration data to indicate that a new public key has been created for the new node. Because the configuration data is accessible only to nodes in the existing networked virtualization environment, only those nodes are allowed to communicate with the new node using the new public key.

After the new public key has been stored, the new node may then be configured by the existing networked virtualization environment using the new public key as shown at 309. The Distributed Configuration Database module of a node(s) in the existing networked virtualization environment may be used to configure the new node such that the new node becomes part of the networked virtualization environment.

Configuration may include providing the new node access to nodes of the existing networked virtualization environment, adding data, configuring a service VM for the new node, etc. Providing the new node access to nodes of the existing networked virtualization environment may involve configuring the new node to include a Distributed Configuration Database module or providing the new node access to configuration data (e.g., public keys for other nodes in the networked virtualization environment). Once the new node is configured it operates in a manner similar to the other nodes in the networked virtualization environment for storage management.

Figure 4:
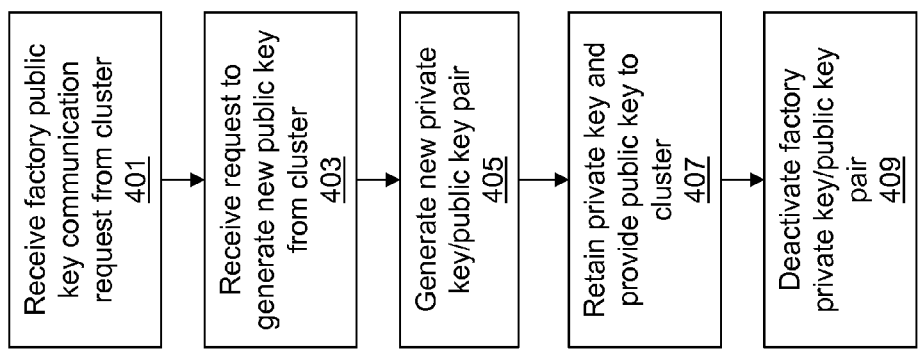
FIG. 4 illustrates a method for providing key-based security for adding nodes within a networked virtualization environment for storage management from the perspective of the new node according to some embodiments of the invention.

FIG. 4 will now be used to describe the method for providing key-based security for adding nodes within the networked virtualization environment from the perspective of the new node.

As mentioned above, the new node is provided with a default factory public key/private key pair, which an existing networked virtualization environment may utilize to initialize communication with the new node. As such, once the existing networked virtualization environment becomes aware of the existence of the new node, it may initialize communication with the new node using the default factory public key in the manner described above.

The new node first receives a factory public key communication request from the existing networked virtualization environment as shown at 401. Because the communication request from the existing networked virtualization environment is made using the default public key provided by the new node, the new node will allow the existing networked virtualization environment access.

Once communication has been initialized between the new node and the existing networked virtualization environment, the new node receives a request to generate a new private key/public key pair from the existing networked virtualization environment as shown at 403. The request is made using the factory public key and as such the new node is able to properly respond to the request.

The new node then generates a new private key/public key pair as shown at 405. Because the new node generates the new private key/public key pair itself, the private key/public key pair is initially unknown to anyone besides the new node. This prevents unwanted external access to the new node, as the new node may control which entities it allows access to by selectively choosing who the new public key is provided to.

The new node retains the new private key and provides the new public key to the existing networked virtualization environment as shown at 407. At this point, all the nodes in the existing networked virtualization environment are allowed access to the new node. The new node becomes a trusted entity to the existing networked virtualization environment once its new public key is released to the existing networked virtualization environment.

The new node then deactivates its factory private key/public key pair as shown at 409. By deactivating its factory private key/public key pair, the new node can no longer be accessed using the factory public key. This ensures that entities outside of the networked virtualization environment are unable to access the new node, because the new node can only be accessed using the new public key, which is known only to the existing networked virtualization environment.

Once the new node has deactivated its factory public key/private key pair, the existing networked virtualization environment may configure the new node such that the new node becomes part of the networked virtualization environment. This may involve providing the new node access to nodes of the existing networked virtualization environment, adding data, configuring a service VM for the new node, etc. Providing the new node access to nodes of the existing networked virtualization environment may involve configuring the new node to include a Distributed Configuration Database module or providing the new node access to configuration data (e.g., public keys for other nodes in the networked virtualization environment).

Because the new private key/public key pair was generated dynamically by the new node in the manner described above in FIGS. 3 and 4, it is only known to the other nodes in the networked virtualization environment and is not known to entities external to the networked virtualization environment. This ensures that the new node can be trusted within the networked virtualization environment and prevents unwanted/accidental access into the networked virtualization environment by way of the new node. Additionally, because key-based security is being used for access control, as opposed to password-based security, enhanced security and decreased susceptibility to theft may be attained.

FIGS. 5A-5D illustrate a method for providing key-based security for adding nodes within a networked virtualization environment for storage management according to some embodiments of the invention.

Figure 5A:
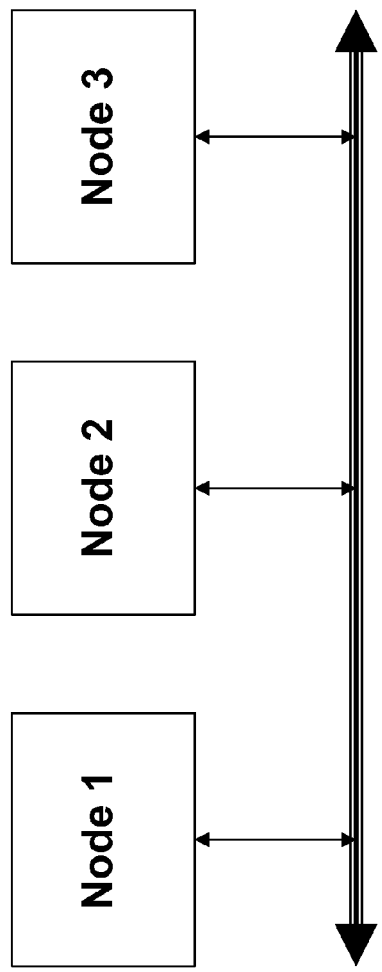

FIG. 5A illustrates an existing networked virtualization environment prior to introduction of a new node. As illustrated in FIG. 5A, 3 nodes having node IDs $N_1$, $N_2$ and $N_3$ are currently operating within the networked virtualization environment for storage management. Each node has already been configured and each node has a private key/public key pair that is known only to the networked virtualization environment. The table in FIG. 5A depicts each node by their node ID and also depicts the corresponding private key/public key pair for each node.

Node $N_1$ has a private key $Pr_1$ and a public key $Pu_1$. Node $N_2$ has a private key $Pr_2$ and a public key $Pu_2$. Node $N_3$ has a private key $Pr_3$ and a public key $Pu_3$. The node IDs and public keys may be stored as configuration data, while the private keys may remain exclusive to their corresponding node. As mentioned above, the configuration data may be utilized by a Distributed Configuration Database module to allow nodes within the networked virtualization environment to identify public keys for communicating with each other. Each node may have its own Distributed Configuration Database module that may be used to access the configuration data for communication. The public keys are known only to nodes within the networked virtualization environment such that external entities are prevented from accessing nodes within the networked virtualization environment.

A new node may then be introduced to the existing networked virtualization environment as illustrated in FIG. 5B. In FIG. 5B, a new node $N_4$ is introduced into the existing networked virtualization environment having nodes $N_1$, $N_2$ and $N_3$. The new node $N_4$ is shaded to indicate that the new node $N_4$ is not yet part of the networked virtualization environment.

As mentioned above, when the new node $N_4$ is introduced to the existing networked virtualization environment it is provided with a default factory private key $Pr_F$ and a default factory public key $Pu_F$. The default public key $Pu_F$ is provided to the existing networked virtualization environment ($N_1$, $N_2$ and $N_3$) to allow for the existing networked virtualization environment to initialize communication with the new node $N_4$.

Figure 5C:
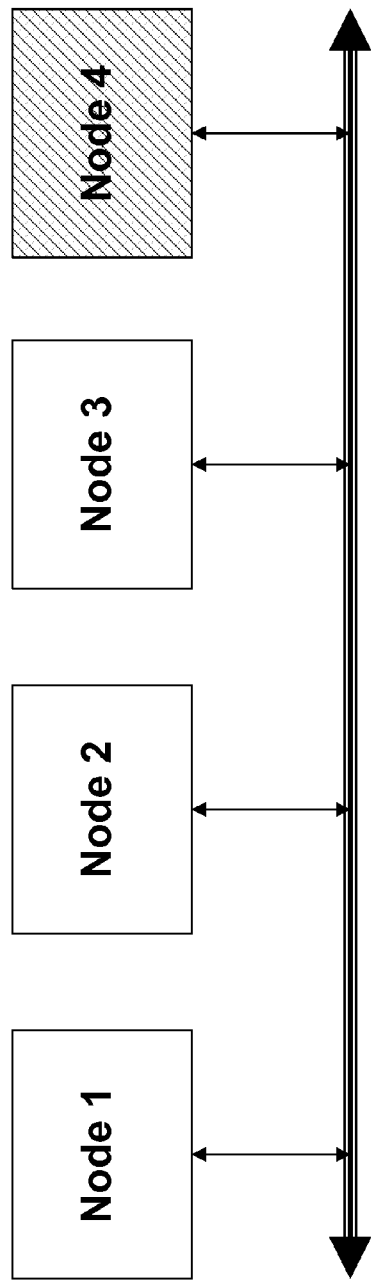

The existing networked virtualization environment ($N_1$, $N_2$ and $N_3$) then requests that the new node $N_4$ generate a new key pair, which is illustrated in FIG. 5C. The new key pair for the new node $N_4$ includes a new private key $Pr_4$ and a new public key $Pu_4$. Once the new node $N_4$ generates the new key pair, it retains the new private key $Pr_4$ and provides the new public key $Pu_4$ to the existing networked virtualization environment ($N_1$, $N_2$ and $N_3$). At the same time, the new node $N_4$ deactivates the factory key (e.g., factory public key and factory private key), such that the new node $N_4$ may no longer be accessed via the original factory key. In this way, the new node $N_4$ is shielded from access external to the networked virtualization environment, because only the new node $N_4$ and the existing networked virtualization environment ($N_1$, $N_2$ and $N_3$) have access to the new public key $Pu_4$. Additionally, because the new private key is known only to the new node, unwanted/accidental access to the new node may be prevented.

The existing networked virtualization environment then stores the new public key $Pu_4$ for the new node $N_4$ in its configuration data. The Distributed Configuration Database module of a node(s) in the existing networked virtualization environment may update its configuration data to indicate that a new public key $Pu_4$ has been created for the new node $N_4$. Because the configuration data is accessible only to nodes $N_1$, $N_2$ and $N_3$ in the existing networked virtualization environment, only those nodes are allowed to communicate with the new node $N_4$ using the new public key $Pu_4$.

At this point, the new node $N_4$ remains shaded because the new node $N_4$ has not yet been configured to be a part of the networked virtualization environment. The new node $N_4$ is trusted by and accessible to the existing networked virtualization environment ($N_1$, $N_2$ and $N_3$), but has not yet been provided access to the existing networked virtualization environment.

Figure 5D:
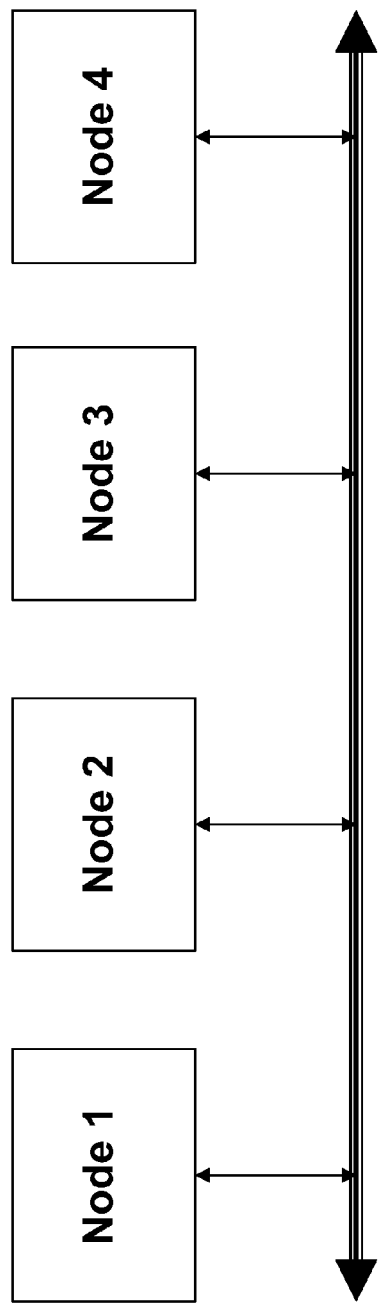

Upon configuration of the new node $N_4$, the new node becomes part of the networked virtualization environment as illustrated in FIG. 5D. Configuration may include providing the new node access to nodes of the existing networked virtualization environment, adding data, configuring a service VM for the new node, etc. Providing the new node access to nodes of the existing networked virtualization environment may involve configuring the new node to include a Distributed Configuration Database module or providing the new node access to configuration data (e.g., public keys for other nodes in the networked virtualization environment). Once the new node is configured it operates in a manner similar to the other nodes in the networked virtualization environment for storage management.

When a node is removed from a networked virtualization environment, measures must be taken to ensure that the process of removing the node does not allow for unwanted or accidental access into nodes of the networked virtualization environment. In order to ensure that removal of a node does not lead to unwanted/accidental access by external entities into the networked virtualization environment, the removed node must not be restored to factory settings until after its ability to access other nodes in the networked virtualization environment is terminated.

Figure 6:
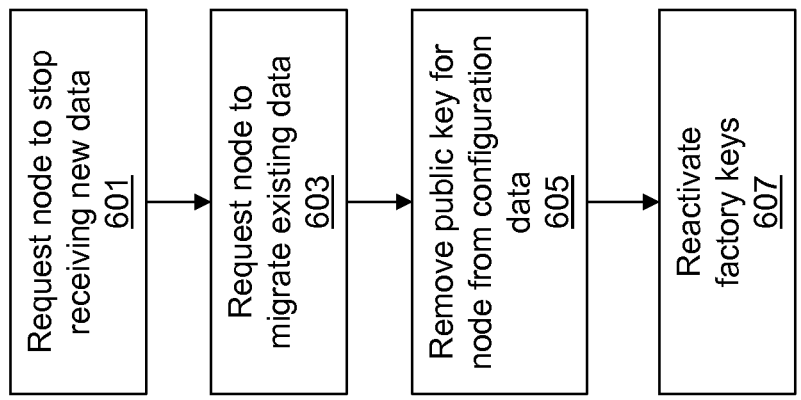
FIG. 6 illustrates a method for providing key-based security for removing nodes from a networked virtualization environment for storage management from the perspective of the other nodes according to some embodiments of the invention.

FIG. 6 is a flow diagram illustrating a method for providing key-based security for removing nodes from a networked virtualization environment for storage management according to some embodiments of the invention. FIG. 6 depicts the method for providing key-based security for removing a target node in the networked virtualization environment from the perspective of the other nodes in the networked virtualization environment.

Initially, another node(s) in the networked virtualization environment requests that the target node (e.g., node to be removed) stop receiving new data as shown at 601. At this point, the target node is still a member of the networked virtualization environment and other nodes within the networked virtualization environment may communicate with the target node using the public key for the target node, which may be identified from the configuration data. In some embodiments, an administrator may communicate with the target node from another node in the networked virtualization environment using a graphical user interface (GUI).

The target node responds to the request by modifying its settings so that it no longer receives and stores any data for the networked virtualization environment. By stopping the target node from receiving any new data, it may be ensured that any data to be stored within the networked virtualization environment, after the process of removing the target node has begun, is stored at other nodes within the networked virtualization environment. This guarantees that any data to be stored within the networked virtualization environment after the process of removing the target node has begun will not be lost upon removal of the target node.

The other node(s) in the networked virtualization environment then request that the target node migrate its existing data as shown at 603. At this point, the target node is still a member of the networked virtualization environment and is still allowed access to the other nodes within the networked virtualization environment using public keys identified in the configuration data.

One ordinarily skilled in the art will recognize that various mechanisms exist for migrating data from the target node to other nodes within the networked virtualization environment. For example, data may be migrated from the target node to other nodes in the networked virtualization environment based on the storage capacity of the other nodes.

By migrating data from the target node to other nodes within the networked virtualization environment, it can be ensured that the data will remain within the networked virtualization environment even after the target node is removed.

After all the data within the target node has been migrated to other nodes of the networked virtualization environment, the public key for the target node may be removed from the configuration data as shown at 605. The public key for the target node may be removed from the configuration data by the Distributed Configuration Database module of a node(s) in the existing networked virtualization environment. For example, an administrator may utilize a graphical user interface (GUI) of a node within the networked virtualization environment to communicate with the Distributed Configuration Database module for removing the target node public key from the configuration data.

Once the public key for the target node has been removed from the configuration data, the target node is no longer recognized as being a member of the networked virtualization environment, and the target node is no longer allowed access to other nodes within the networked virtualization environment. Because the target node is no longer allowed access to other nodes within the networked virtualization environment, external access to the networked virtualization environment via the target node is prevented.

At the same time the target node public key is removed, the target node reactivates its factory public key/private key pair as shown at 607. Even though an external entity may now access the target node using the factory public key, the target node is no longer recognized as a member of the networked virtualization environment and is no longer given access to other nodes within the networked virtualization environment. As such, any external access to the target node is prevented from reaching the networked virtualization environment.

Figure 7:
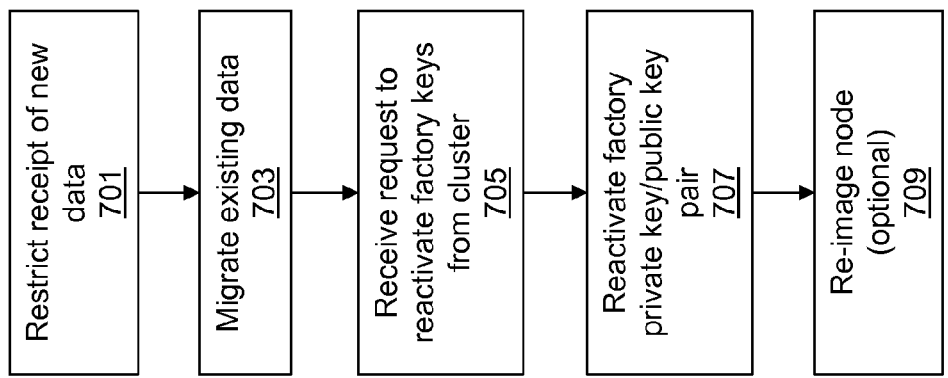
FIG. 7 illustrates a method for providing key-based security for removing nodes from a networked virtualization environment for storage management from the perspective of a target node according to some embodiments of the invention.

FIG. 7 will now be used to describe the method for providing key-based security for removing nodes within the networked virtualization environment from the perspective of the target node (e.g., node to be removed).

Initially, the other nodes in the networked virtualization environment will identify the target node as the node to be removed and will send a request to the target node to restrict the receipt of data for the networked virtualization environment. In response, the target node will restrict the receipt of data for the networked virtualization environment as shown at 701. This may involve the target node modifying its settings such that the networked virtualization environment does not consider the target node when locating nodes for providing storage management functions.

At this point, the target node is still a member of the networked virtualization environment and other nodes within the networked virtualization environment may communicate with the target node using the public key for the target node, which may be identified from the configuration data. As mentioned above, by stopping the target node from receiving any new data, it may be ensured that any data to be stored within the networked virtualization environment after the process of removing the target node has begun is stored at other nodes within the networked virtualization environment. This guarantees that any data to be stored within the networked virtualization environment after the process of removing the target node has begun will not be lost upon removal of the target node.

The other node(s) in the networked virtualization environment then request that the target node migrate its existing data. In response, the target node migrates its existing data as shown at 703. At this point, the target node is still a member of the networked virtualization environment and is still allowed access to the other nodes within the networked virtualization environment using public keys identified in the configuration data.

As mentioned above, various mechanisms exist for migrating data from the target node to other nodes within the networked virtualization environment. For example, data may be migrated from the target node to other nodes in the networked virtualization environment based on the storage capacity of the other nodes. By migrating data from the target node to other nodes within the networked virtualization environment, it can be ensured that the data will remain within the networked virtualization environment even after the target node is removed.

After all the data within the target node has been migrated to other nodes of the networked virtualization environment, the public key for the target node is removed from the configuration data. Once the public key for the target node has been removed from the configuration data, the target node is no longer recognized as being a member of the networked virtualization environment, and the target node is no longer allowed access to other nodes within the networked virtualization environment. Because the target node is no longer allowed access to other nodes within the networked virtualization environment, external access to the networked virtualization environment via the target node is prevented.

At the same time the target node public key is removed, the target node receives a request to reactivate its factory private key/public key pair from another node(s) in the networked virtualization environment as shown at 705. In response, the target node reactivates its factory private key/public key pair as shown at 707. Once the target node reactivates its factory private key/public key pair, it may no longer be accessed using the public key generated when the target node was originally added to the networked virtualization environment and may only be accessed using the factory public key.

Even though an external entity may now access the target node using the factory public key, the target node is no longer recognized as a member of the networked virtualization environment and is no longer given access to other nodes within the networked virtualization environment. As such, any external access to the target node is prevented from reaching the networked virtualization environment.

The target node may then optionally re-image itself as shown at 709. Re-imaging involves placing the target node back into its original factory state (i.e., state before being added to a networked virtualization environment).

FIGS. 8A-8D illustrate a method for providing key-based security for removing nodes within a networked virtualization environment for storage management according to some embodiments of the invention.

Figure 8A:
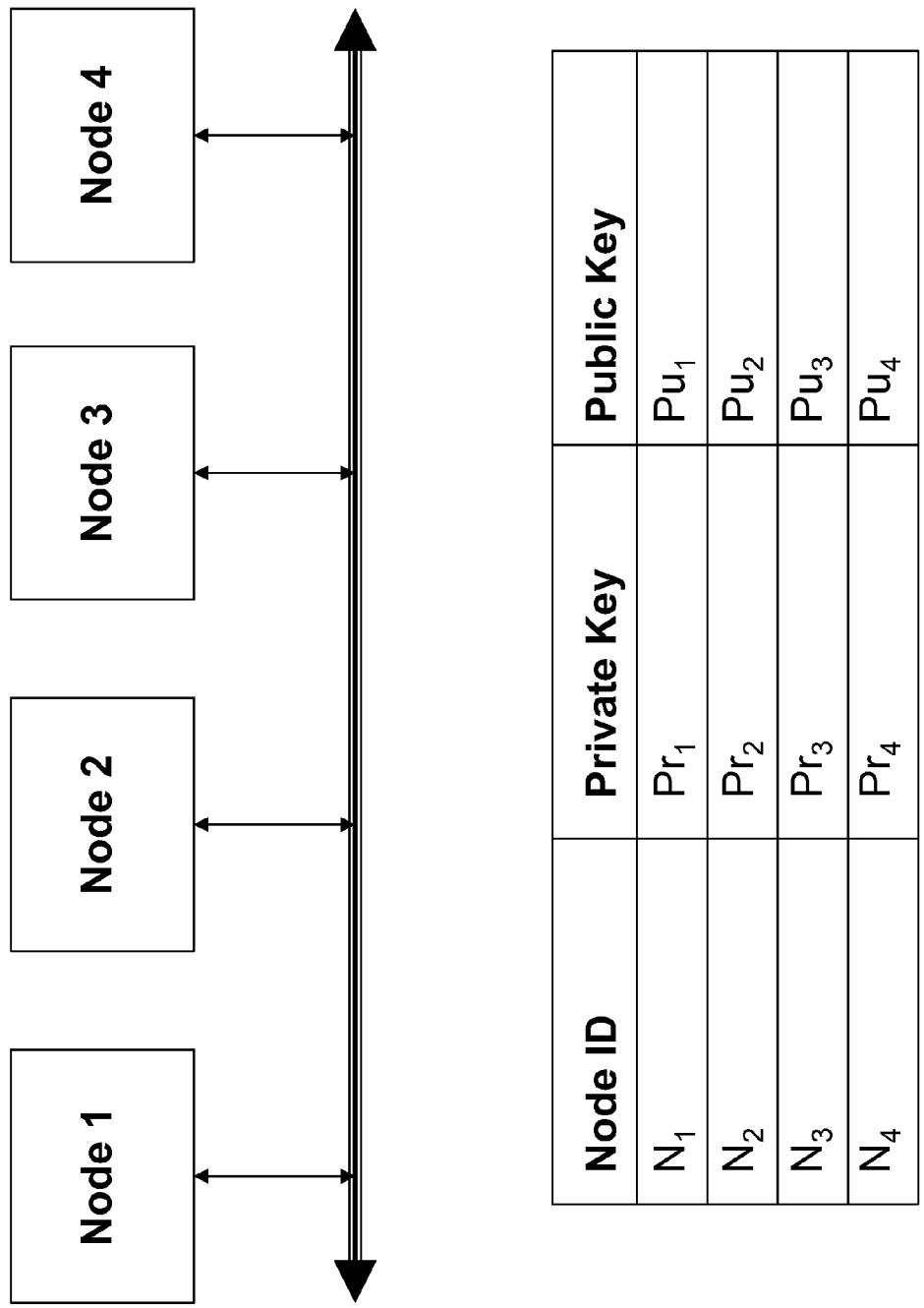

FIG. 8A illustrates an existing networked virtualization environment prior to removal of a target node. As illustrated in FIG. 8A, 4 nodes having node IDs $N_1$, $N_2$, $N_3$ and $N_4$ are currently operating within the networked virtualization environment for storage management. Each node has already been configured and each node has a private key/public key pair that is known only to the networked virtualization environment. The table in FIG. 8A depicts each node by their node ID and also depicts the corresponding private key/public key pair for each node.

Node $N_1$ has a private key $Pr_1$ and a public key $Pu_1$. Node $N_2$ has a private key $Pr_2$ and a public key $Pu_2$. Node $N_3$ has a private key $Pr_3$ and a public key $Pu_3$. Node $N_4$ has a private key $Pr_4$ and a public key $Pu_4$. The node IDs and public keys may be stored as configuration data, while the private keys may remain exclusive to their corresponding node. As mentioned above, the configuration data may be utilized by a Distributed Configuration Database module to allow nodes within the networked virtualization environment to identify public keys for communicating with each other. Each node may have its own Distributed Configuration Database module that may be used to access the configuration data for communication. The public keys are known only to nodes within the networked virtualization environment such that external entities are prevented from accessing nodes within the networked virtualization environment.

A target node may then begin being removed from the existing networked virtualization environment as illustrated in FIG. 8B. In FIG. 8B, a target node $N_4$ begins the process of being removed from a networked virtualization environment having nodes $N_1$, $N_2$, $N_3$ and $N_4$. The target node $N_4$ is shaded to indicate that the target node $N_4$ has begun the removal process.

As mentioned above, when the target node $N_4$ begins the removal process, it is first restricted from receiving data for the networked virtualization environment. The target node $N_4$ then migrates its existing data to the other nodes ($N_1$, $N_2$ and $N_3$) in the networked virtualization environment. At this point, the target node $N_4$ is still a member of the networked virtualization environment and other nodes ($N_1$, $N_2$ and $N_3$) within the networked virtualization environment may communicate with the target node $N_4$ using the public key for the target node $N_4$.

By stopping the target node $N_4$ from receiving any new data, it may be ensured that any data to be stored within the networked virtualization environment after the process of removing the target node $N_4$ has begun is stored at other nodes ($N_1$, $N_2$ and $N_3$) within the networked virtualization environment. This guarantees that any data to be stored within the networked virtualization environment after the process of removing the target node $N_4$ has begun will not be lost upon removal of the target node $N_4$.

Likewise, by migrating data from the target node $N_4$ to other nodes ($N_1$, $N_2$ and $N_3$) within the networked virtualization environment, it can be ensured that the data will remain within the networked virtualization environment even after the target node $N_4$ is removed.

Figure 8C:
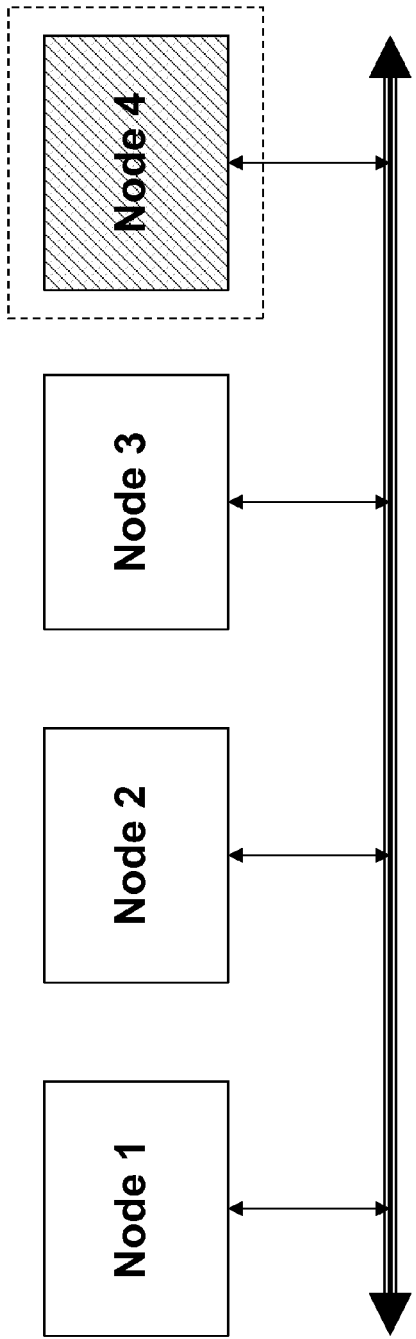

After all the data within the target node $N_4$ has been migrated to other nodes ($N_1$, $N_2$ and $N_3$) of the networked virtualization environment, the public key for the target node is removed from the configuration data and the target node $N_4$ is no longer recognized as being a member of the networked virtualization environment. This is depicted in FIG. 8C, where the target node $N_4$ is surrounded by a dashed box to indicate that it is no longer recognized as being a member of the networked virtualization environment. Because the target node $N_4$ is no longer recognized as being a member of the networked virtualization environment, the target node $N_4$ is no longer allowed access to other nodes ($N_1$, $N_2$ and $N_3$) within the networked virtualization environment and thus, external access to the networked virtualization environment via the target node is prevented.

At the same time the target node $N_4$ public key is removed from the configuration data, the target node $N_4$ receives a request to reactivate its factory private key/public key pair. In response, the target node $N_4$ reactivates its factory private key/public key pair, which is illustrated in the table of FIG. 8C. Once the target node $N_4$ reactivates its factory private key/public key pair, it may no longer be accessed using the public key generated ($Pu_4$) when the target node $N_4$ was originally added to the networked virtualization environment and may only be accessed using the factory public key $Pu_F$.

Figure 8D:
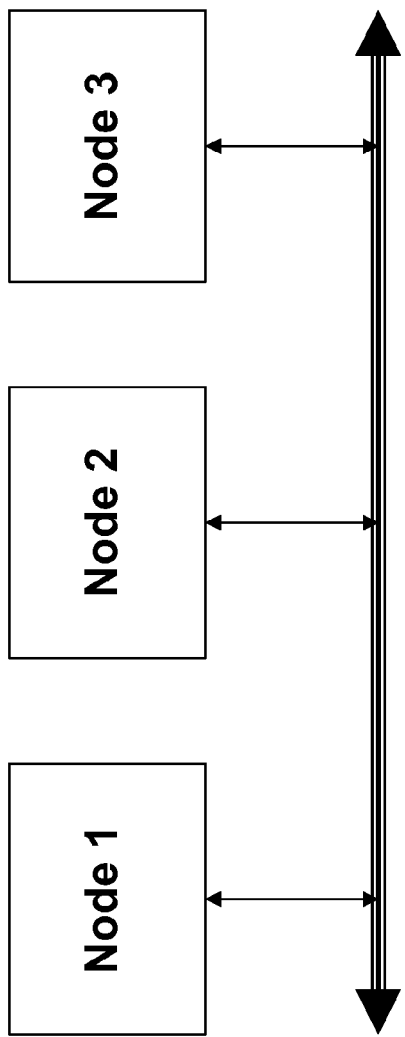

After the target node $N_4$ reverts back to its factory keys, it is no longer part of the networked virtualization environment as shown in FIG. 8D. Additional steps, such as re-imaging, may be performed in order to bring the target node $N_4$ back to its original factory settings.

As discussed earlier, even though an external entity may now access the target node $N_4$ using the factory public key $P_F$, the target node $N_4$ is no longer recognized as a member of the networked virtualization environment and is no longer give access to nodes within the networked virtualization environment. As such, any external access to the target node is prevented from reaching the networked virtualization environment.

System Architecture

Figure 9:
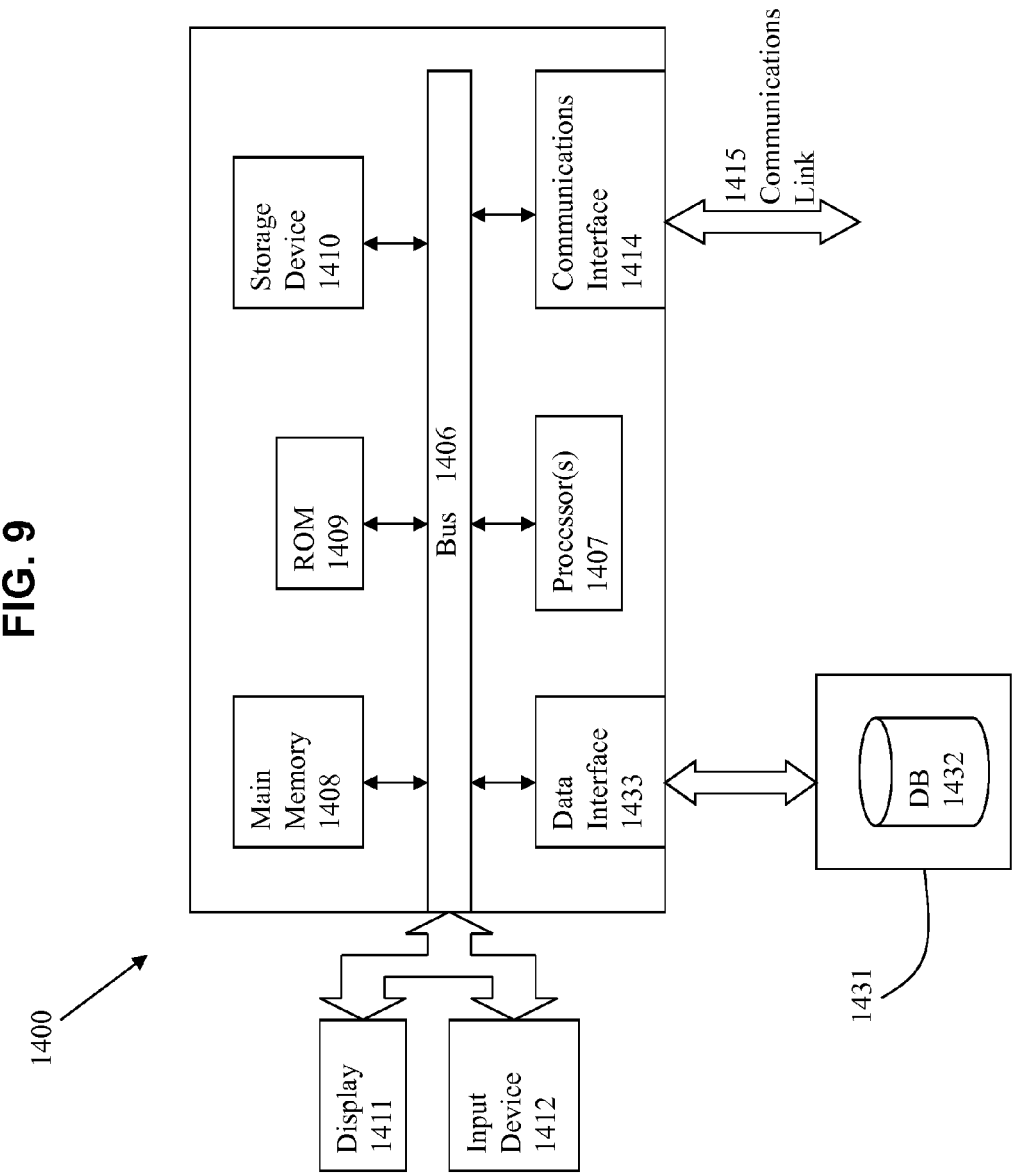
FIG. 9 is a block diagram of a computing system suitable for implementing an embodiment of the present invention.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for providing key-based security for adding a new node to an existing networked virtualization environment for storage management, comprising:
   discovering the new node in a cluster of existing nodes in the virtualization environment;
   establishing communication with the new node via the cluster of existing nodes, the cluster of existing nodes establishing communication with the new node using a factory public key;
   requesting the new node to generate a new key pair comprising a new private key and a new public key;
   receiving the new public key by the cluster of existing nodes, wherein subsequent communication with the new node by the cluster of existing nodes is performed using the new public key; and
   configuring the new node, in response to receiving the new public key, to become part of the cluster of existing nodes using the new public key, and the new node is provided access to the virtualization environment only after deactivating both the factory public key and the corresponding factory private key.

2. The method of claim 1, wherein discovering the new node is performed by a distributed configuration database module of the cluster of existing nodes.

3. The method of claim 2, wherein the distributed configuration database module notifies an administrator of the cluster of existing nodes of the existence of the new node.

4. The method of claim 1, wherein establishing communication with the new node using the factory public key is performed by an administrator using a graphical user interface (GUI) of an existing node in the cluster of existing nodes.

5. The method of claim 1, wherein the new node generates the new private key and new public key pair in response to the request.

6. The method of claim 5, wherein the new node retains the new private key.

7. The method of claim 6, wherein the new private key is known only to the new node.

8. The method of claim 1, wherein only the new node and the cluster of existing nodes in the virtualization environment have access to the new public key.

9. The method of claim 1, further comprising storing the new public key in configuration data associated with the cluster of existing nodes in the virtualization environment.

10. The method of claim 1, wherein configuring the new node to become part of the cluster of existing nodes comprises providing the new node access to the cluster of existing nodes in the virtualization environment.

11. The method of claim 10, wherein providing the new node access to the cluster of existing nodes in the virtualization environment comprises configuring the new node to include a distributed configuration database module.

12. The method of claim 10, wherein providing the new node access to the cluster of existing nodes in the virtualization environment comprises providing the new node access to configuration data associated with the cluster of existing nodes in the virtualization environment.

13. A computer program product embodied on a non-transitory computer readable medium, the non-transitory computer readable medium having stored thereon a sequence of instructions which, when executed by a processor causes the processor to execute a method for providing key-based security for adding a new node to an existing networked virtualization environment for storage management, comprising:
  discovering the new node in a cluster of existing nodes in the virtualization environment;
  establishing communication with the new node via the cluster of existing nodes, the cluster of existing nodes establishing communication with the new node using a factory public key;
  requesting the new node to generate a new key pair comprising a new private key and a new public key;
  receiving the new public key by the cluster of existing nodes, wherein subsequent communication with the new node by the cluster of existing nodes is performed using the new public key; and
  configuring the new node, in response to receiving the new public key, to become part of the cluster of existing nodes using the new public key, and the new node is provided access to the virtualization environment only after deactivating both the factory public key and the corresponding factory private key.

14. The computer program product of claim 13, wherein discovering the new node is performed by a distributed configuration database module of the cluster of existing nodes.

15. The computer program product of claim 14, wherein the distributed configuration database module notifies an administrator of the cluster of existing nodes of the existence of the new node.

16. The computer program product of claim 13, wherein establishing communication with the new node using the factory public key is performed by an administrator using a graphical user interface (GUI) of an existing node in the cluster of existing nodes.

17. The computer program product of claim 13, wherein the new node generates the new private key and new public key pair in response to the request.

18. The computer program product of claim 17, wherein the new node retains the new private key.

19. The computer program product of claim 18, wherein the new private key is known only to the new node.

20. The computer program product of claim 13, wherein only the new node and the cluster of existing nodes in the virtualization environment have access to the new public key.

21. The computer program product of claim 13, further comprising storing the new public key in configuration data associated with the cluster of existing nodes in the virtualization environment.

22. The computer program product of claim 13, wherein configuring the new node to become part of the cluster of existing nodes comprises providing the new node access to the cluster of existing nodes in the virtualization environment.

23. The computer program product of claim 22, wherein providing the new node access to the cluster of existing nodes in the virtualization environment comprises configuring the new node to include a distributed configuration database module.

24. The computer program product of claim 22, wherein providing the new node access to the cluster of existing nodes in the virtualization environment comprises providing the new node access to configuration data associated with the cluster of existing nodes in the virtualization environment.

25. A method for providing key-based security for removing a target node from an existing networked virtualization environment for storage management, comprising:
  requesting the target node to stop receiving data for the existing networked virtualization environment;
  requesting the target node to migrate its existing data to other nodes in the existing networked virtualization environment;
  removing the target node from the existing networked virtualization environment by, after the target node has migrated its existing data, removing a public key for the target node from configuration data associated with the existing networked virtualization environment; and
  requesting, after the public key for the target node has been removed from the configuration data, the target node to reactivate its factory public key and factory public key pair, and the target node is accessible via the factory public key and the corresponding factory private key only after the target node is no longer allowed to access the other nodes in the existing network virtualization environment.

26. The method of claim 25, wherein the target node modifies its settings such that it no longer receives data for the existing networked virtualization environment in response to the request to stop receiving data.

27. The method of claim 26, wherein the target node remains a member of the existing networked virtualization environment after it stops receiving data for the existing networked virtualization environment.

28. The method of claim 25, wherein the target node migrates its existing data to other nodes in the existing networked virtualization environment in response to the request to migrate.

29. The method of claim 28, wherein the target node remains a member of the existing networked virtualization environment while it migrates its existing data to the other nodes.

30. The method of claim 25, wherein removing the public key for the target node from the configuration data associated with the existing networked virtualization environment is performed by a distributed configuration database module of another node in the existing networked virtualization environment.

31. The method of claim 25, wherein removing the public key for the target node prevents external access to the other nodes of the existing networked virtualization environment via the target node.

32. The method of claim 25, wherein the target node deactivates its private key and public key in response to the request to reactivate.

33. The method of claim 32, wherein the target node reactivates its factory private key and factory public key in response to the response to reactivate.

34. The method of claim 25, further comprising re-imaging the target node.

35. A computer program product embodied on a non-transitory computer readable medium, the non-transitory computer readable medium having stored thereon a sequence of instructions which, when executed by a processor causes the processor to execute a method for providing key-based security for removing a target node from an existing networked virtualization environment for storage management, comprising:
   requesting the target node to stop receiving data for the existing networked virtualization environment;
   requesting the target node to migrate its existing data to other nodes in the existing networked virtualization environment;
   removing the target node from the existing networked virtualization environment by, after the target node has migrated its existing data, removing a public key for the target node from configuration data associated with the existing networked virtualization environment; and
   requesting, after the public key for the target node has been removed from the configuration data, the target node to reactivate its factory public key and factory public key pair, and the target node is accessible via the factory public key and the corresponding factory private key only after the target node is no longer allowed to access the other nodes in the existing network virtualization environment.

36. The computer program product of claim 35, wherein the target node modifies its settings such that it no longer receives data for the existing networked virtualization environment in response to the request to stop receiving data.

37. The computer program product of claim 36, wherein the target node remains a member of the existing networked virtualization environment after it stops receiving data for the existing networked virtualization environment.

38. The computer program product of claim 35, wherein the target node migrates its existing data to other nodes in the existing networked virtualization environment in response to the request to migrate.

39. The computer program product of claim 38, wherein the target node remains a member of the existing networked virtualization environment while it migrates its existing data to the other nodes.

40. The computer program product of claim 35, wherein removing the public key for the target node from the configuration data associated with the existing networked virtualization environment is performed by a distributed configuration database module of another node in the existing networked virtualization environment.

41. The computer program product of claim 35, wherein removing the public key for the target node prevents external access to the other nodes of the existing networked virtualization environment via the target node.

42. The computer program product of claim 35, wherein the target node deactivates its private key and public key in response to the request to reactivate.

43. The computer program product of claim 42, wherein the target node reactivates its factory private key and factory public key in response to the response to reactivate.

44. The computer program product of claim 35, further comprising re-imaging the target node.

* * * * *